(12) United States Patent
Osawa et al.

(10) Patent No.: US 10,410,562 B2
(45) Date of Patent: Sep. 10, 2019

(54) IMAGE GENERATING DEVICE AND IMAGE GENERATING METHOD

(71) Applicant: Sony Computer Entertainment Inc., Tokyo (JP)

(72) Inventors: Hiroshi Osawa, Kanagawa (JP); Yoichi Nishimaki, Kanagawa (JP); Takeshi Yamagishi, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 949 days.

(21) Appl. No.: 14/411,675

(22) PCT Filed: Apr. 23, 2013

(86) PCT No.: PCT/JP2013/002752
§ 371 (c)(1),
(2) Date: Dec. 29, 2014

(87) PCT Pub. No.: WO2014/010157
PCT Pub. Date: Jan. 16, 2014

(65) Prior Publication Data
US 2015/0163473 A1    Jun. 11, 2015

(30) Foreign Application Priority Data
Jul. 11, 2012 (JP) ................................. 2012-155607

(51) Int. Cl.
*G09G 3/20* (2006.01)
*H04N 13/344* (2018.01)
(Continued)

(52) U.S. Cl.
CPC ............. *G09G 3/20* (2013.01); *G06T 3/4038* (2013.01); *H04N 13/156* (2018.05);
(Continued)

(58) Field of Classification Search
CPC ..................................................... G09G 3/20
(Continued)

(56) References Cited

U.S. PATENT DOCUMENTS 7,594,853 B2    9/2009 Noro
7,635,305 B2    12/2009 Yamada
(Continued)

FOREIGN PATENT DOCUMENTS

CN    101909705 A    12/2010
CN    102163413 A    8/2011
(Continued)

OTHER PUBLICATIONS

Office Action for corresponding CN application 201380035615.1, 7 pages, dated Jan. 28, 2016.
(Continued)

*Primary Examiner* — Chikaodili E Anyikire
*Assistant Examiner* — Shanika M Brumfield
(74) *Attorney, Agent, or Firm* — Matthew B. Dernier, Esq.

(57) ABSTRACT

An image generating device configured to provide a cloud service to a head-mounted display via a network is provided. A photographed image receiving section 510 receives a plurality of photographed images photographed in different photographing directions. A panoramic image processing section 530 generates a panoramic image by synthesizing the plurality of photographed images photographed in the different photographing directions. A format converting section 540 converts the panoramic image into an image format suitable for specifications of the head-mounted display. A panoramic image transmitting section 550 transmits the panoramic image after format conversion to the head-mounted display.

5 Claims, 18 Drawing Sheets

(51) Int. Cl.
  *G06T 3/40* (2006.01)
  *H04N 13/221* (2018.01)
  *H04N 13/279* (2018.01)
  *H04N 13/156* (2018.01)
  *G02B 27/01* (2006.01)
(52) U.S. Cl.
  CPC ......... *H04N 13/221* (2018.05); *H04N 13/279* (2018.05); *H04N 13/344* (2018.05); *G02B 27/017* (2013.01); *G02B 2027/014* (2013.01); *G02B 2027/0129* (2013.01); *G02B 2027/0138* (2013.01); *G02B 2027/0187* (2013.01)
(58) Field of Classification Search
  USPC ...................................................... 348/42–60
  See application file for complete search history.

(56) References Cited

U.S. PATENT DOCUMENTS

| | | | |
|---|---|---|---|
| 8,189,225 B1* | 5/2012 | Lo | G06F 3/122 358/1.15 |
| 8,576,276 B2 | 11/2013 | Bar-Zeev | |
| 8,585,476 B2* | 11/2013 | Mullen | A63F 13/25 463/1 |
| 8,675,042 B2 | 3/2014 | Shimaya | |
| 8,983,777 B2 | 3/2015 | Kaido | |
| 9,098,167 B1* | 8/2015 | Issa | G06F 3/04815 |
| 9,143,771 B2 | 9/2015 | Kim | |
| 2002/0015522 A1 | 2/2002 | Rogina | |
| 2002/0070916 A1* | 6/2002 | Noro | A63F 13/10 345/156 |
| 2004/0058732 A1* | 3/2004 | Piccionelli | A63F 13/12 463/42 |
| 2005/0049022 A1* | 3/2005 | Mullen | A63F 13/12 463/1 |
| 2006/0079329 A1* | 4/2006 | Yamada | A63F 13/12 463/39 |
| 2006/0154713 A1* | 7/2006 | Sunazuka | A63F 13/12 463/6 |
| 2006/0247049 A1 | 11/2006 | Noro | |
| 2009/0164916 A1 | 6/2009 | Jeong | |
| 2009/0189982 A1 | 7/2009 | Tawiah | |
| 2011/0205335 A1 | 8/2011 | Kim | |
| 2011/0242273 A1 | 10/2011 | Shimaya | |
| 2012/0039507 A1* | 2/2012 | Ikenoue | G06F 3/012 382/103 |
| 2012/0127284 A1* | 5/2012 | Bar-Zeev | G02B 27/017 348/53 |
| 2012/0146850 A1* | 6/2012 | Liu | G01S 19/09 342/357.42 |
| 2012/0184373 A1* | 7/2012 | Kim | H04L 65/4084 463/42 |
| 2013/0103310 A1* | 4/2013 | Kaido | G01C 21/20 701/519 |
| 2013/0194305 A1* | 8/2013 | Kakuta | G06T 19/006 345/633 |

FOREIGN PATENT DOCUMENTS

| | | | | |
|---|---|---|---|---|
| CN | 102540464 A | 7/2012 | | |
| JP | 10283151 A | 10/1998 | | |
| JP | 2000353248 A | 12/2000 | | |
| JP | 2002210236 A | 7/2002 | | |
| JP | 2005318934 A | 11/2005 | | |
| JP | 2007133738 A | 5/2007 | | |
| JP | 2009093478 A | 4/2009 | | |
| JP | 2011229116 A | 11/2011 | | |
| JP | 2012014599 A | 1/2012 | | |
| JP | 2012048597 A | 3/2012 | | |
| JP | WO 2012029576 A1 * | 3/2012 | ........... | G06T 19/006 |
| WO | 2010023963 A1 | 3/2010 | | |
| WO | 2010143359 A1 | 12/2010 | | |
| WO | 2012029576 A1 | 3/2012 | | |
| WO | WO-2012029576 A1 * | 3/2012 | ........... | G06T 19/006 |

OTHER PUBLICATIONS

International Preliminary Report on Patentability and Written Opinion for corresponding application PCT/JP2013/002752, dated Jan. 22, 2015.
International Search Report for corresponding application PCT/JP2013/002752, dated Jul. 2, 2013.
Office Action for corresponding CN application 201380035615.1, 18 pages, dated Jul. 14, 2016.
Office Action for corresponding JP application 2016031165, 11 pages, dated Jan. 17, 2017.
Notification of Reason for Refusal for corresponding JP application 2017182018, 11 pages, dated Jul. 10, 2018.

* cited by examiner

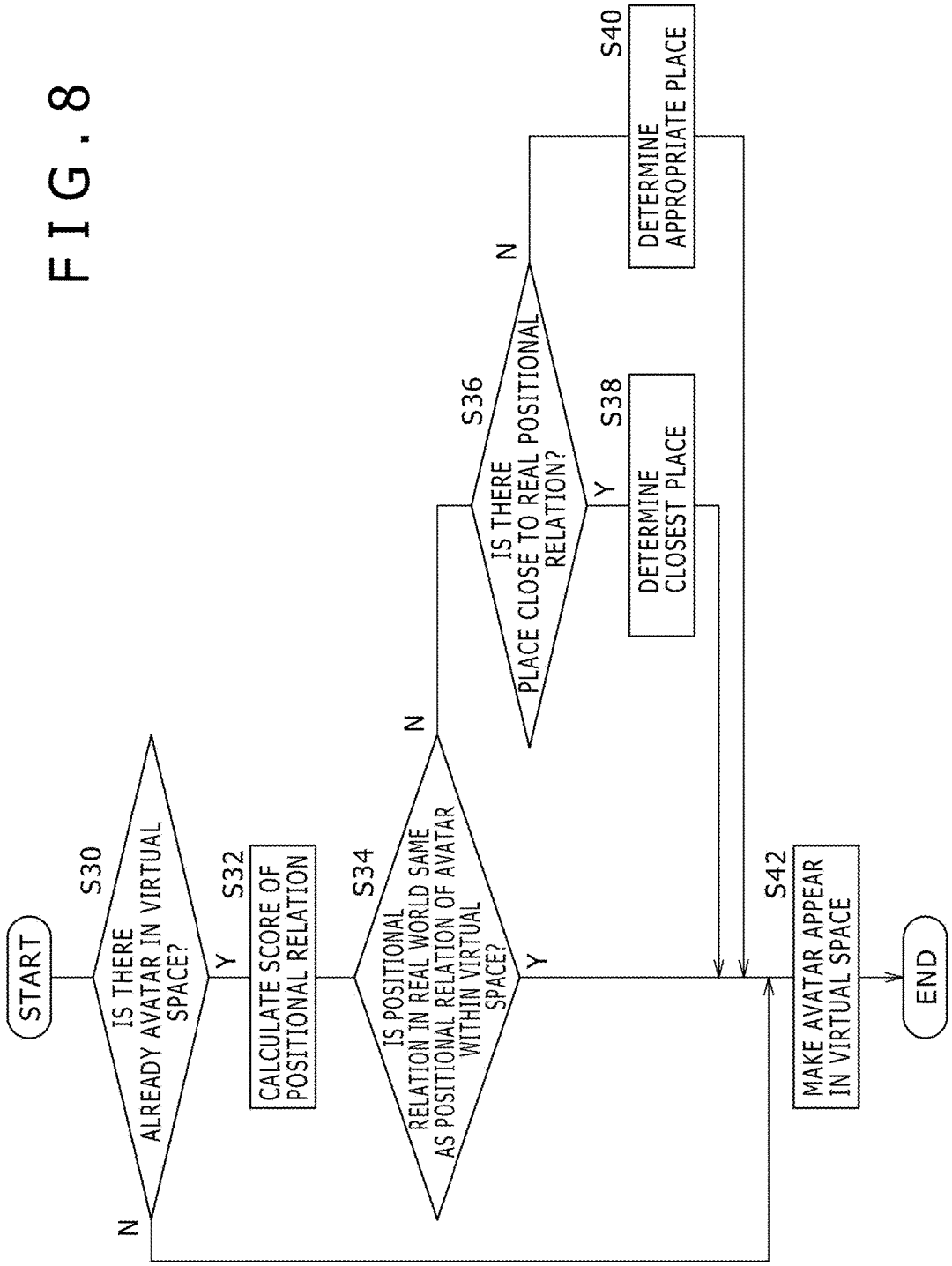

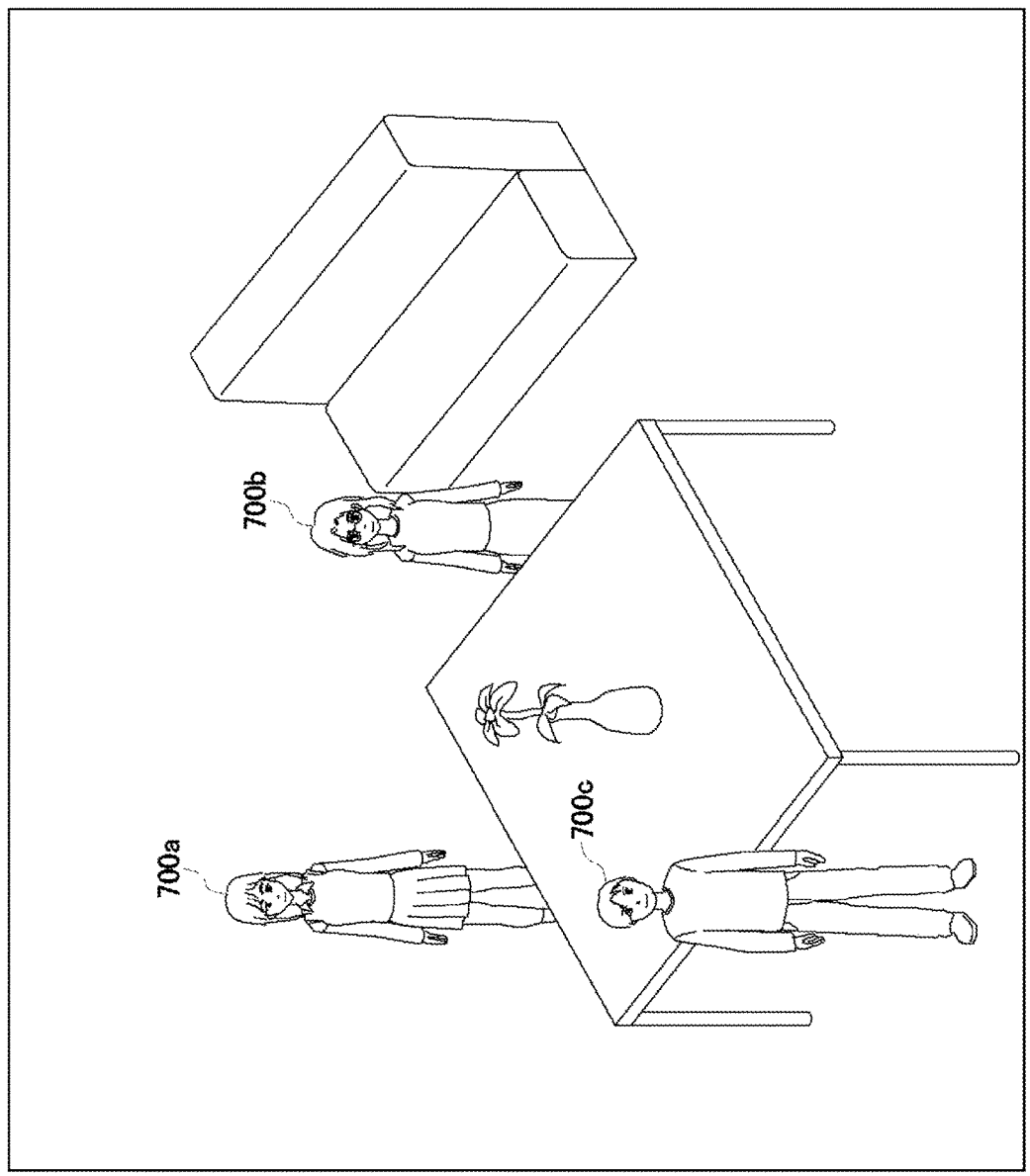

FIG. 12
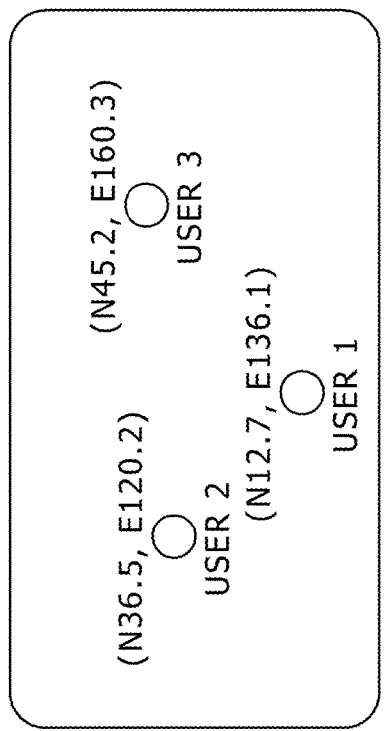
(a)
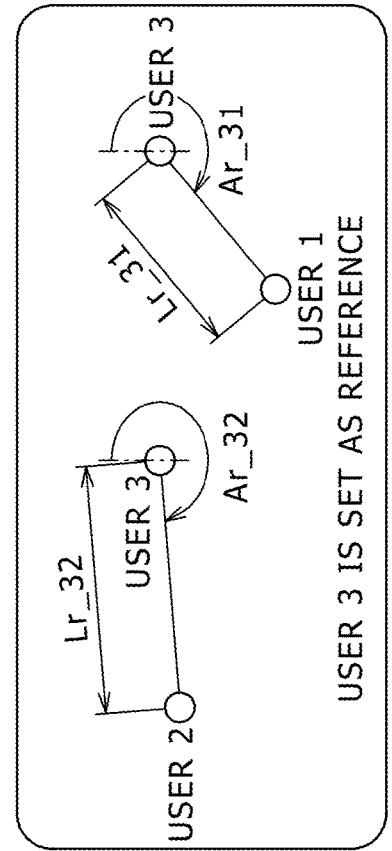
(c) USER 3 IS SET AS REFERENCE
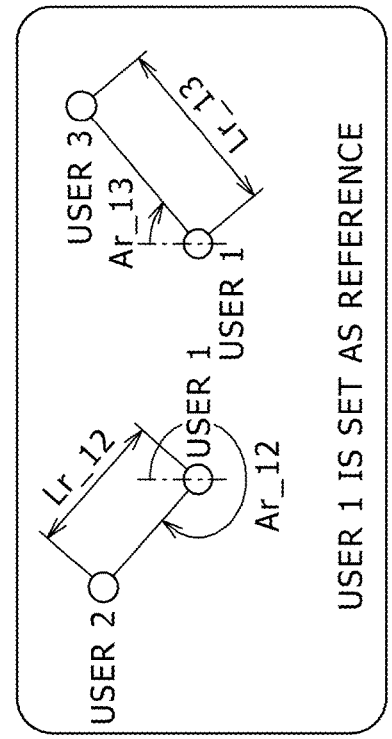
(b) USER 1 IS SET AS REFERENCE FIG. 13
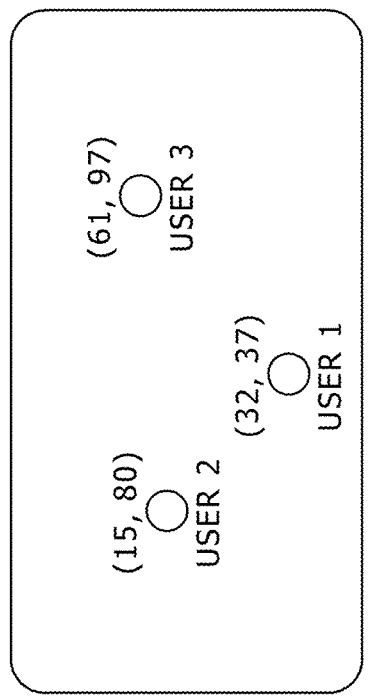
(a)
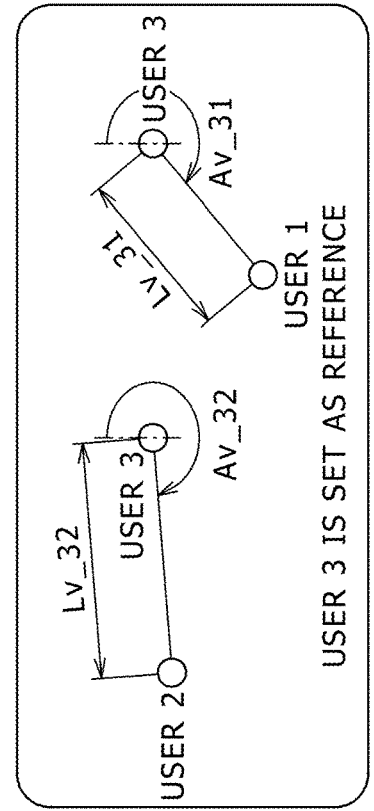
(c) USER 3 IS SET AS REFERENCE
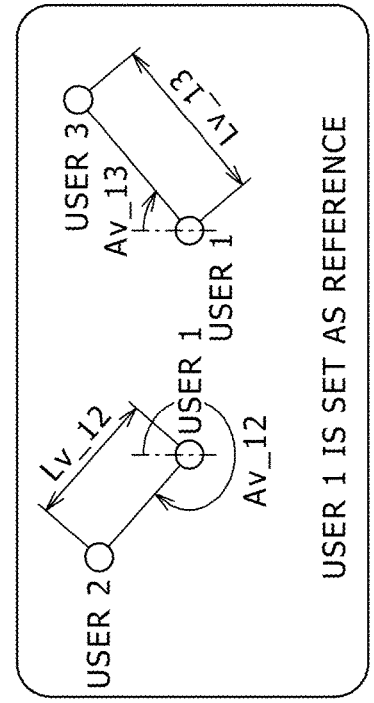
(b) USER 1 IS SET AS REFERENCE

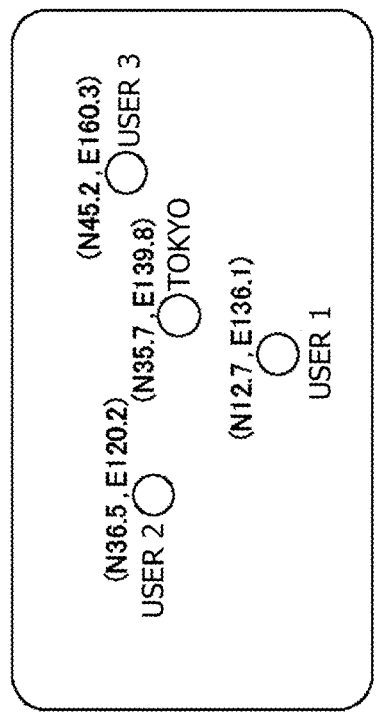
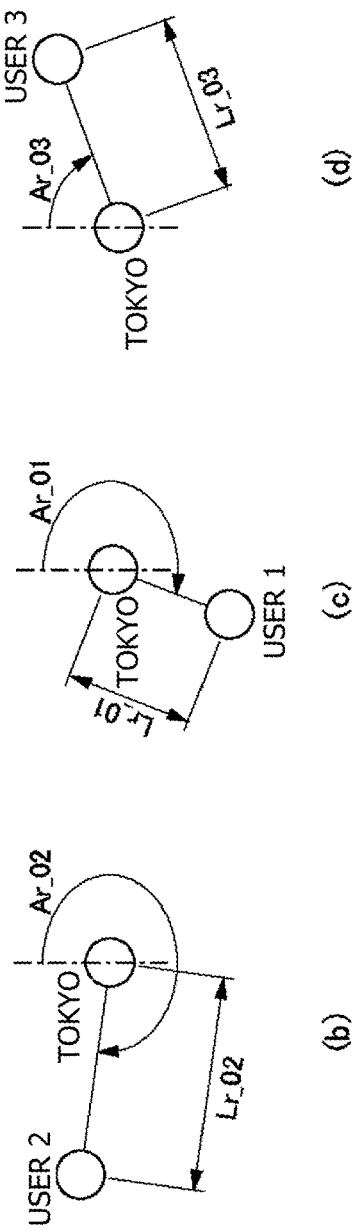
FIG. 14

FIG.15
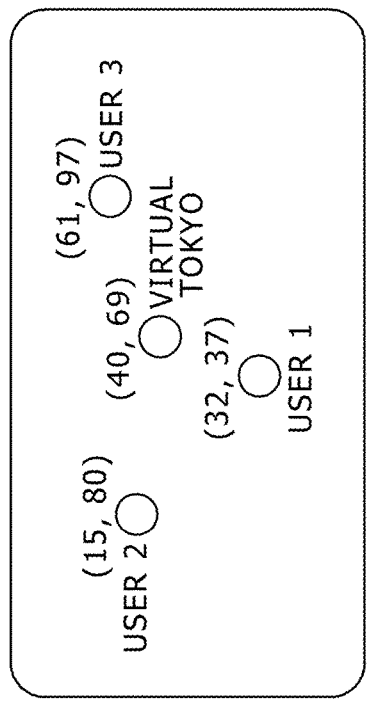
(a)
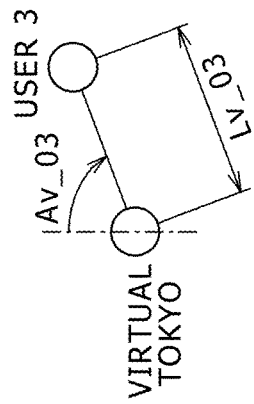
(b)
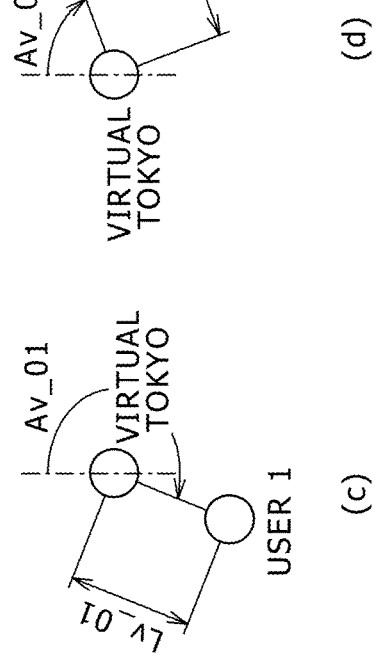
(c)
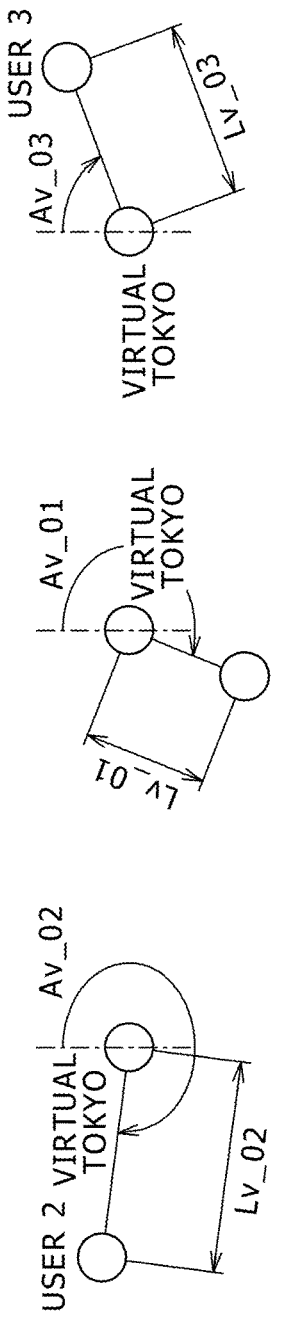
(d)

IMAGE GENERATING DEVICE AND IMAGE GENERATING METHOD

TECHNICAL FIELD

The present invention relates to a device and a method adapted to generate an image to be displayed on a head-mounted display.

BACKGROUND ART

There are games played by operating a controller or the like while wearing, on a head, a head-mounted display connected to a game machine, and viewing a screen displayed on the head-mounted display. In the case of an ordinary stationary display connected to a game machine, a visual field range of a user spreads to the outside of the display screen. Thus, it may not be possible to concentrate on the display screen, and there may be a lack of a sense of immersion in a game. In this respect, when wearing a head-mounted display, the user does not view anything other than video displayed on the head-mounted display. Thus, a sense of immersion in a video world is enhanced, and the entertainment quality of a game can be further enhanced.

In addition, when a panoramic image is displayed on the head-mounted display to display a 360-degree panoramic image or a virtual space while the user wearing the head-mounted display rotates the head, the sense of immersion in video is further enhanced, and also the operability of an application such as a game is improved.

SUMMARY

Technical Problems

However, to display a panoramic image or a virtual space on the head-mounted display requires a calculating power and increases a processing load on the side of the head-mounted display.

The present invention has been made in view of such problems. It is an object of the present invention to provide an image generating device and an image generating method that can efficiently generate an image to be displayed on a head-mounted display.

Solution to Problems

In order to solve the above problems, according to a mode of the present invention, there is provided an image generating device configured to provide a cloud service to a head-mounted display via a network, the image generating device including: a photographed image receiving section receiving a plurality of photographed images photographed in different photographing directions; a panoramic image processing section generating a panoramic image by synthesizing the plurality of photographed images photographed in the different photographing directions; a format converting section converting the panoramic image into an image format suitable for specifications of the head-mounted display; and a panoramic image transmitting section transmitting the panoramic image after format conversion to the head-mounted display.

Another mode of the present invention is also an image generating device. The device is an image generating device configured to provide a cloud service to a head-mounted display via a network, the image generating device including: a position information receiving section receiving information on a position of a user wearing the head-mounted display, the information being obtained by a position sensor included in the head-mounted display; a positional relation processing section determining positional relation between characters of a plurality of users on a basis of positional relation between the plurality of users; a three-dimensional rendering section arranging the characters of the plurality of users in a virtual space on a basis of the determined positional relation between the characters, and rendering the virtual space; and a rendering data transmitting section transmitting information on the rendered virtual space to the head-mounted display.

Yet another mode of the present invention is an image generating method. The method is an image generating method for providing a cloud service to a head-mounted display via a network, the image generating method including: a photographed image receiving step of receiving a plurality of photographed images photographed in different photographing directions; a panoramic image processing step of generating a panoramic image by synthesizing the plurality of photographed images photographed in the different photographing directions; a format converting step of converting the panoramic image into an image format suitable for specifications of the head-mounted display; and a panoramic image transmitting step of transmitting the panoramic image after format conversion to the head-mounted display.

Yet another mode of the present invention is also an image generating method. This method is an image generating method for providing a cloud service to a head-mounted display via a network, the image generating method including: a position information receiving step of receiving information on a position of a user wearing the head-mounted display, the information being obtained by a position sensor included in the head-mounted display; a positional relation processing step of determining positional relation between characters of a plurality of users on a basis of positional relation between the plurality of users; a three-dimensional rendering step of arranging the characters of the plurality of users in a virtual space on a basis of the determined positional relation between the characters, and rendering the virtual space; and a rendering data transmitting step of transmitting information on the rendered virtual space to the head-mounted display.

It is to be noted that arbitrary combinations of the above constituent elements as well as modes realized by converting expressions of the present invention between a method, a device, a system, a computer program, a data structure, a recording medium, and the like are also effective as modes of the present invention.

Advantageous Effect of Invention

According to the present invention, an image to be displayed on a head-mounted display can be generated efficiently.

BRIEF DESCRIPTION OF DRAWINGS

FIG. 8 is a flowchart of assistance in explaining, in detail, a procedure of processing for positional relation to another user in FIG. 7.

FIG. 9C is a diagram of assistance in explaining the avatar of a third user which avatar has appeared in the virtual space.

FIG. 12 is a diagram of assistance in explaining a method of calculating scores of positional relation of users in a case where there is no geographical correlation between a virtual space and a real world.

FIG. 13 is a diagram of assistance in explaining a method of calculating scores of positional relation of users in a case where there is no geographical correlation between a virtual space and a real world.

FIG. 14 is a diagram of assistance in explaining a method of calculating scores of positional relation of users in a case where there is a geographical correlation between a virtual space and a real world.

FIG. 15 is a diagram of assistance in explaining a method of calculating scores of positional relation of users in a case where there is a geographical correlation between a virtual space and a real world.

DESCRIPTION OF EMBODIMENTS

Figure 1:
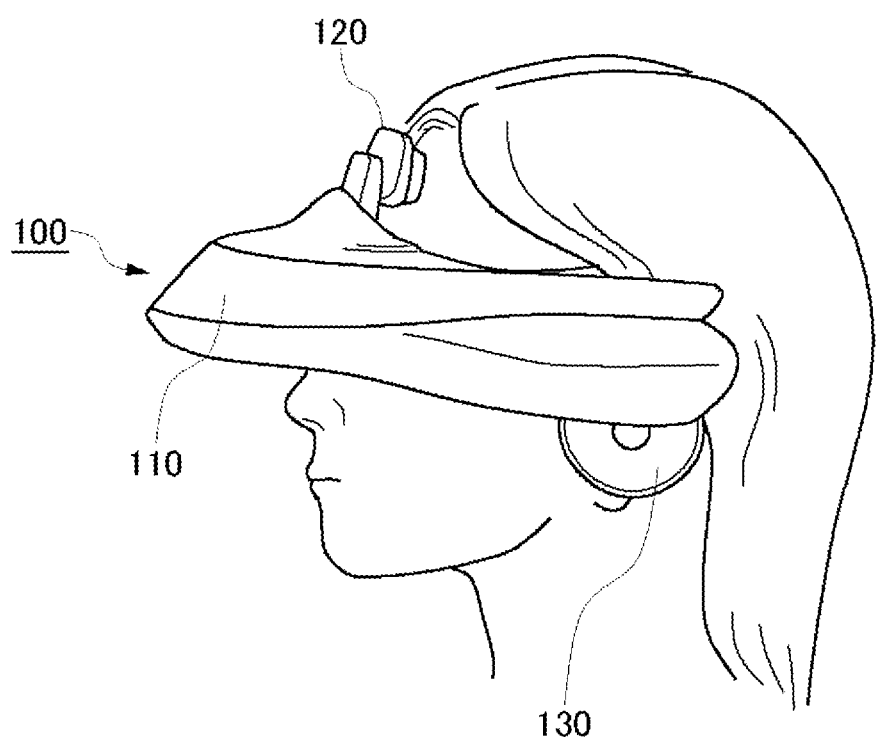
FIG. 1 is an external view of a head-mounted display.

FIG. 1 is an external view of a head-mounted display 100. The head-mounted display 100 includes a main body portion 110, a frontal region contact portion 120, and a temporal region contact portion 130.

The head-mounted display 100 is a display device mounted on the head of a user to view a still image, a moving image, or the like displayed on the display and listen to sound, music, or the like output from headphones.

A position sensor such as a GPS (Global Positioning System) included in or external to the head-mounted display 100 can measure position information of the user. In addition, an attitude sensor included in or external to the head-mounted display 100 can measure attitude information such as an orientation and an inclination of the head of the user wearing the head-mounted display 100.

The main body portion 110 includes the display, the position information obtaining sensor, the attitude sensor, a communication device, and the like. The frontal region contact portion 120 and the temporal region contact portion 130 include a biological information obtaining sensor capable of measuring biological information such as a body temperature, a pulse, blood components, perspiration, brain waves, and a cerebral blood flow of the user.

The head-mounted display 100 may be further provided with a camera configured to photograph an eye of the user. The camera mounted on the head-mounted display 100 can detect a line of sight, pupil movement, blinking, and the like of the user.

Description in the following will be made of a method of generating an image to be displayed on the head-mounted display 100. However, the image generating method according to the present embodiment is not limited to the head-mounted display 100 in a narrow sense, but is also applicable to cases of wearing eyeglasses, an eyeglass type display, an eyeglass type camera, headphones, a headset (headphones provided with a microphone), earphones, an earring, an ear-hook camera, headgear, headgear provided with a camera, a headband, and the like.

Figure 2:
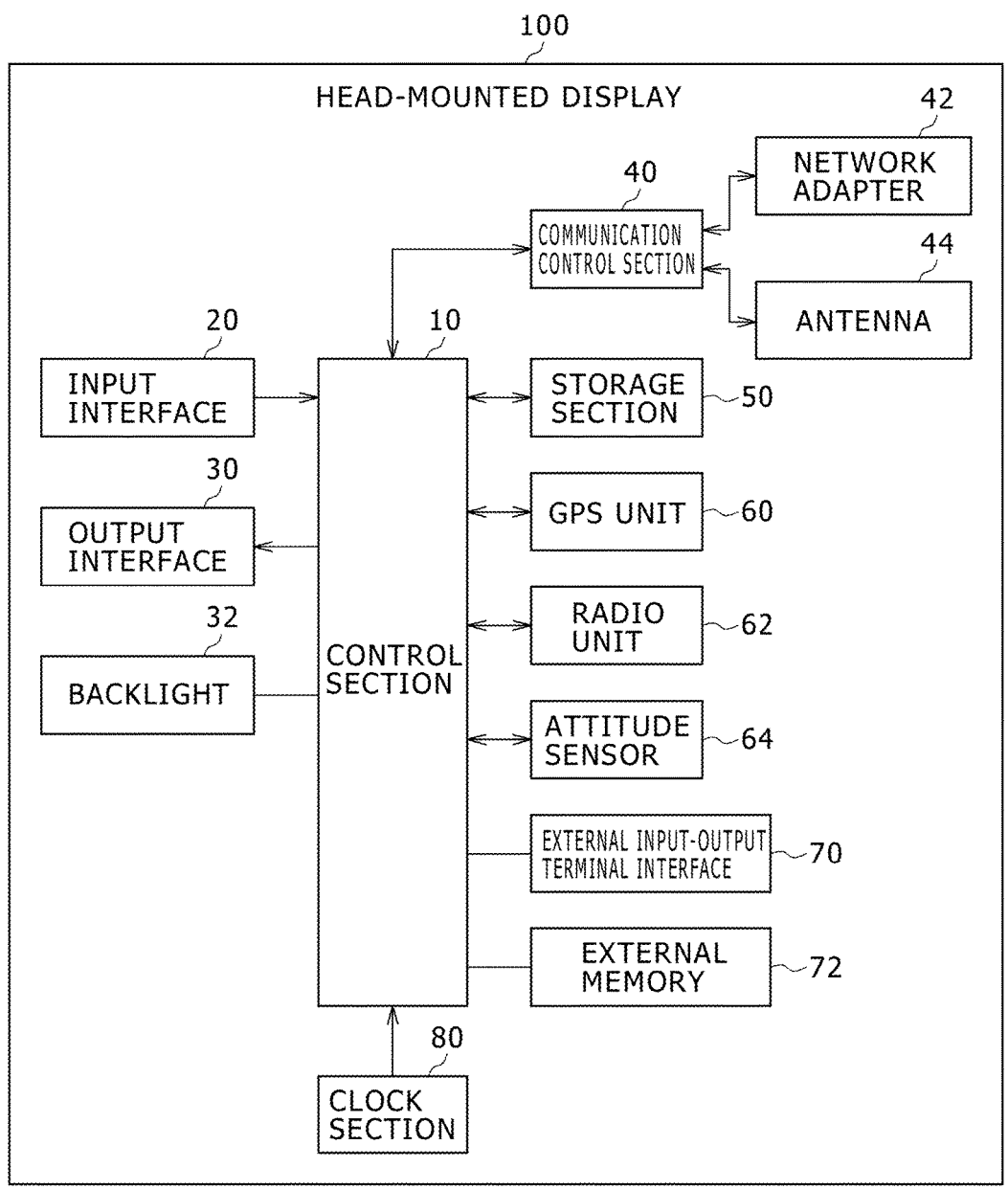
FIG. 2 is a functional block diagram of the head-mounted display.

FIG. 2 is a functional block diagram of the head-mounted display 100.

A control section 10 is a main processor that processes and outputs a signal such as an image signal or a sensor signal, an instruction, or data. An input interface 20 receives an operation signal or a setting signal from a touch panel and a touch panel controller, and supplies the signal to the control section 10. An output interface 30 receives an image signal from the control section 10, and makes the image signal displayed on the display. A backlight 32 supplies backlight to the liquid crystal display.

A communication control section 40 transmits data input from the control section 10 to the outside by wire or wireless communication via a network adapter 42 or an antenna 44. The communication control section 40 also receives data from the outside by wire or wireless communication via the network adapter 42 or the antenna 44, and outputs the data to the control section 10.

A storage section 50 temporarily stores data, a parameter, an operation signal, and the like processed by the control section 10.

A GPS unit 60 receives position information from a GPS satellite and supplies the position information to the control section 10 according to an operation signal from the control section 10. A radio unit 62 receives position information from a radio base station and supplies the position information to the control section 10 according to an operation signal from the control section 10.

An attitude sensor 64 detects attitude information such as an orientation and an inclination of the main body portion 110 of the head-mounted display 100. The attitude sensor 64 is realized by combining a gyro sensor, an acceleration sensor, an angular acceleration sensor, and the like as appropriate.

An external input-output terminal interface 70 is an interface for connecting a peripheral device such as a USB (Universal Serial Bus) controller. An external memory 72 is an external memory such as a flash memory.

A clock section 80 sets time information according to a setting signal from the control section 10. The clock section 80 supplies time data to the control section 10.

The control section 10 can supply an image or text data to the output interface 30 to display the image or the text data on the display, and supply the image or the text data to the communication control section 40 to transmit the image or the text data to the outside.

Figure 3:
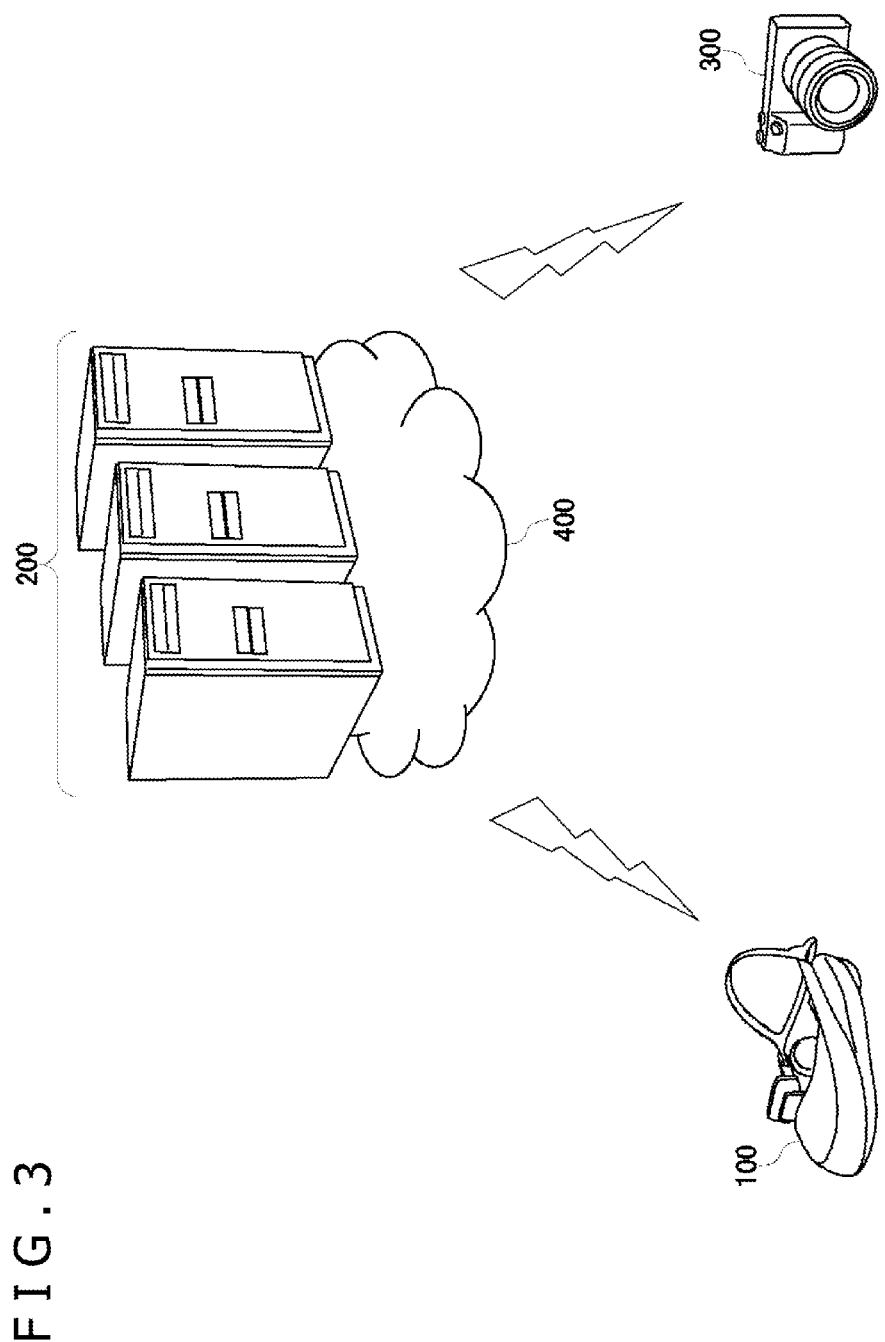
FIG. 3 is a configuration diagram of an image generating system.

FIG. 3 is a configuration diagram of an image generating system according to the present embodiment. The image generating system includes the head-mounted display 100, a cloud server 200, and a camera 300.

The head-mounted display 100 is an example of a head-mounted type display device that the user wears on the head of the user to view an image such as a still image and a moving image. The head-mounted display 100 includes a communication function using a wired LAN, a wireless LAN, Bluetooth (trademark), a mobile telephone line, and the like, and is thus capable of data input and output from and to the outside. The head-mounted display 100 performs data communication with the cloud server 200 via a network 400. In addition, it is possible to measure the position of the user by the GPS sensor included in the head-mounted display 100, and transmit the position information of the user to the cloud server 200. In addition, it is possible to measure the orientation and inclination of the head-mounted display 100 by the attitude sensor included in the head-mounted display 100, and transmit the attitude information to the cloud server 200.

The camera 300 is an example of an image data obtaining device capable of photographing a two-dimensional or three-dimensional still image or a two-dimensional or three-dimensional moving image. The camera 300 has a communication function using a wired LAN, a wireless LAN, Bluetooth (trademark), a mobile telephone line, and the like, and is thus capable of data input and output from and to the outside. The camera 300 performs data communication with the cloud server 200 via the network 400. In addition, the camera 300 has a function of recording device information such as an exposure at a time of photographing, lens information and an attitude. The camera 300 can transmit the device information to the cloud server 200 together with photographed image data. In addition, the camera 300 may have a function of measuring a distance to a photographed subject by a built-in or external distance sensor using an ultrasonic wave or a laser. The camera 300 can transmit the distance information to the cloud server 200 together with photographed image data.

The cloud server 200 processes image data obtained by the camera 300 into a form suitable for display on the head-mounted display 100, and transmits the processed image data to the head-mounted display 100.

For example, in order to support head-mounted displays whose hardware specifications are different from each other, the cloud server 200 may perform conversion into data optimized for each head-mounted display with respect to resolution, a display method, image quality, and the like. The cloud server 200 may process the image data photographed by the camera 300 into optimum image data for display on the head-mounted display. The cloud server 200 may process a plurality of photographed images photographed by a plurality of cameras configured to photograph two-dimensional images into image data capable of three-dimensional display. The cloud server 200 may calculate data on a distance to a subject from a plurality of photographed images photographed by a plurality of cameras configured to photograph two-dimensional images. The cloud server 200 may combine distance data obtained by the distance sensor with image data and thereby process the image data into image data capable of two-dimensional display. The cloud server 200 may generate panoramic image data by piecing together data photographed by the camera 300.

Because various processing can be thus applied to images on the side of the cloud server 200 by using a cloud service, the hardware configuration of the head-mounted display 100 and the camera 300 can be made simple and inexpensive. When an image photographed by the camera 300 is transmitted to the cloud server 200, and the head-mounted display 100 receives optimized data and displays the optimized data, the user can view a panoramic image at a remote place in real time.

Figure 4:
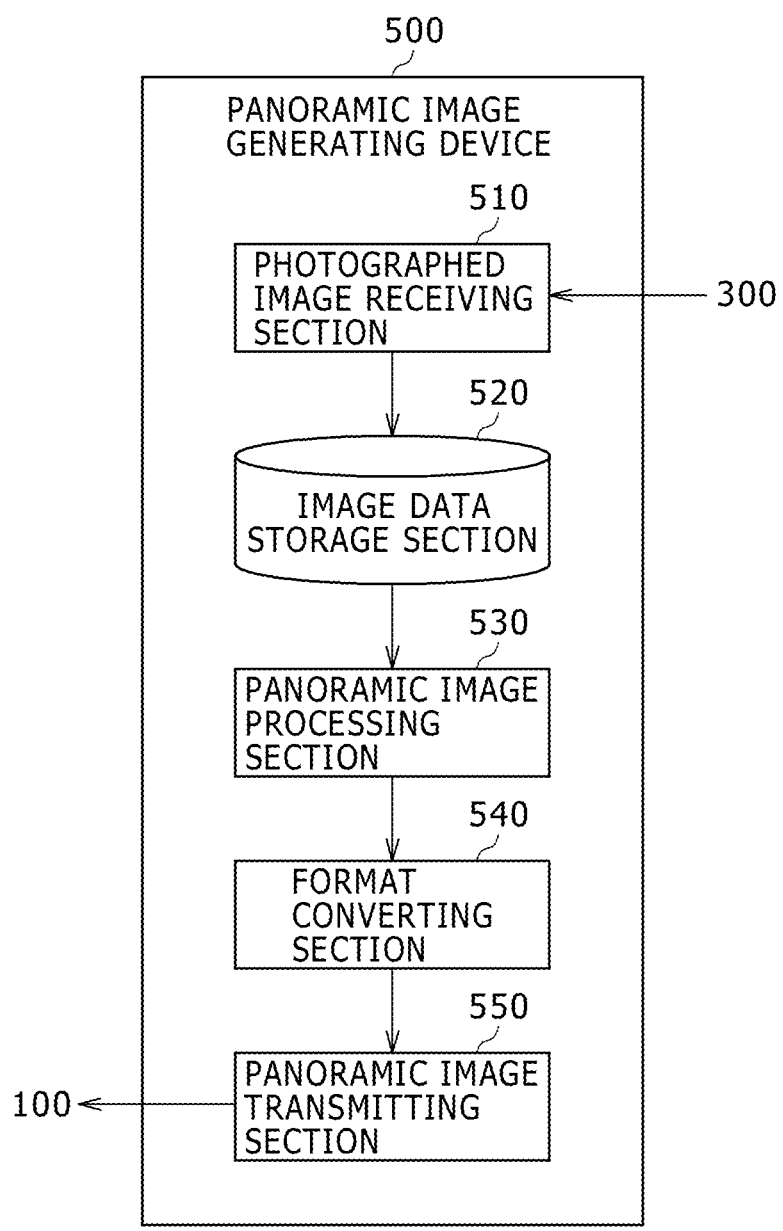
FIG. 4 is a functional block diagram of a panoramic image generating device.

FIG. 4 is a functional block diagram of a panoramic image generating device 500. The functional configuration of the panoramic image generating device 500 is implemented in the cloud server 200. Part of the functional configuration of the panoramic image generating device 500 can also be implemented in the head-mounted display 100 or the camera 300.

A photographed image receiving section 510 receives a plurality of photographed images photographed in different photographing directions from the camera 300, and stores the plurality of photographed images in an image data storage section 520. A panoramic image processing section 530 generates a panoramic image by piecing together the plurality of photographed images photographed in the different photographing directions, the plurality of photographed images being stored in the image data storage section 520, by stitching processing.

A format converting section 540 converts resolution, an aspect ratio, a three-dimensional display data format, and the like of the panoramic image according to the specifications of the head-mounted display 100.

A panoramic image transmitting section 550 transmits the panoramic image data converted by the format converting section 540 to the head-mounted display 100.

In a case where the camera 300 is an imaging device capable of panoramic photographing, the photographed image receiving section 510 receives a panoramic image from the camera 300, and stores the panoramic image in the image data storage section 520. In this case, stitching processing is not necessary. It therefore suffices for the format converting section 540 to read out the panoramic image from the image data storage section 520 and covert the image format according to the specifications of the head-mounted display 100.

In a case where the camera 300 has a distance sensor configured to measure a distance to a subject, the photographed image receiving section 510 receives distance information from the camera 300 together with a two-dimensional panoramic photographed image, and stores the two-dimensional panoramic photographed image and the distance information in the image data storage section 520. The panoramic image processing section 530 performs image analysis, calculates a parallax from the two-dimensional panoramic photographed image using the distance information, and generates a three-dimensional panoramic image including an image for a left eye and an image for a right eye. The format converting section 540 converts resolution, an aspect ratio, a display data format, and the like of the three-dimensional panoramic image according to the specifications of the head-mounted display 100. The panoramic image transmitting section 550 transmits the three-dimensional panoramic image to the head-mounted display 100.

In addition, the panoramic image processing section 530 of the cloud server 200 may apply various kinds of effects to an actually photographed image photographed by the camera 300. For example, an effect of a computer graphics (CG) tone, an animation tone, a sepia tone, or the like is applied to the actually photographed image. In addition, the panoramic image processing section 530 may generate CG such as a game character, and perform rendering by superimposing the CG on the actually photographed image photographed by the camera 300. The cloud server 200 can thereby distribute video contents resulting from the synthesis of the actually photographed image and the CG to the head-mounted display 100.

Figure 5:
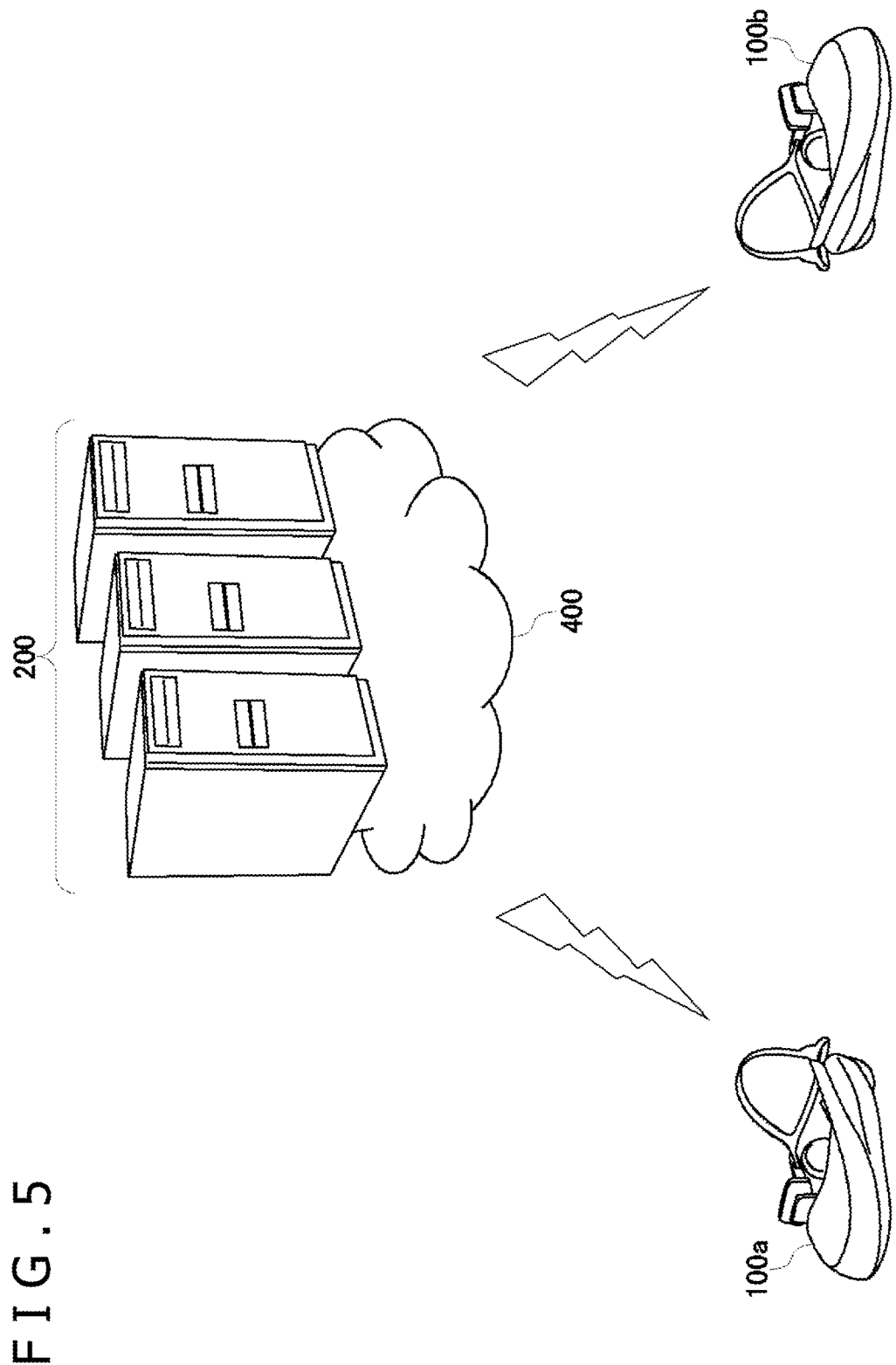
FIG. 5 is a configuration diagram of a system in which video is shared by a plurality of head-mounted displays.

FIG. 5 is a configuration diagram of a system in which video is shared by a plurality of head-mounted displays. The video sharing system includes a plurality of head-mounted displays 100a and 100b and a cloud server 200. The head-mounted displays 100a and 100b communicate data with the cloud server 200 via a network 400.

The head-mounted displays 100a and 100b transmit position information of users in a real world to the cloud server 200. The cloud server 200 transmits image data reflecting the positional relation between the users to the head-mounted displays 100a and 100b.

For example, in a case where a plurality of users are sitting surrounding a table in one room, the cloud server 200 reflects real position information in position information of avatars in a virtual world on the basis of the position information of each user, thereby determines the positions of the avatars, and renders the avatars of the respective users within the virtual space. In addition, in a case where a plurality of users wear a head-mounted display within a movie theater or in front of an exhibit, video at different viewpoint positions may be distributed to the head-mounted displays of the users according to the positions of the users in the real world. In addition, in a case where the plurality of users are situated at different locations, distances between the locations of the users may be reflected in positional relation between the avatars and display sizes of the avatars.

Figure 6:
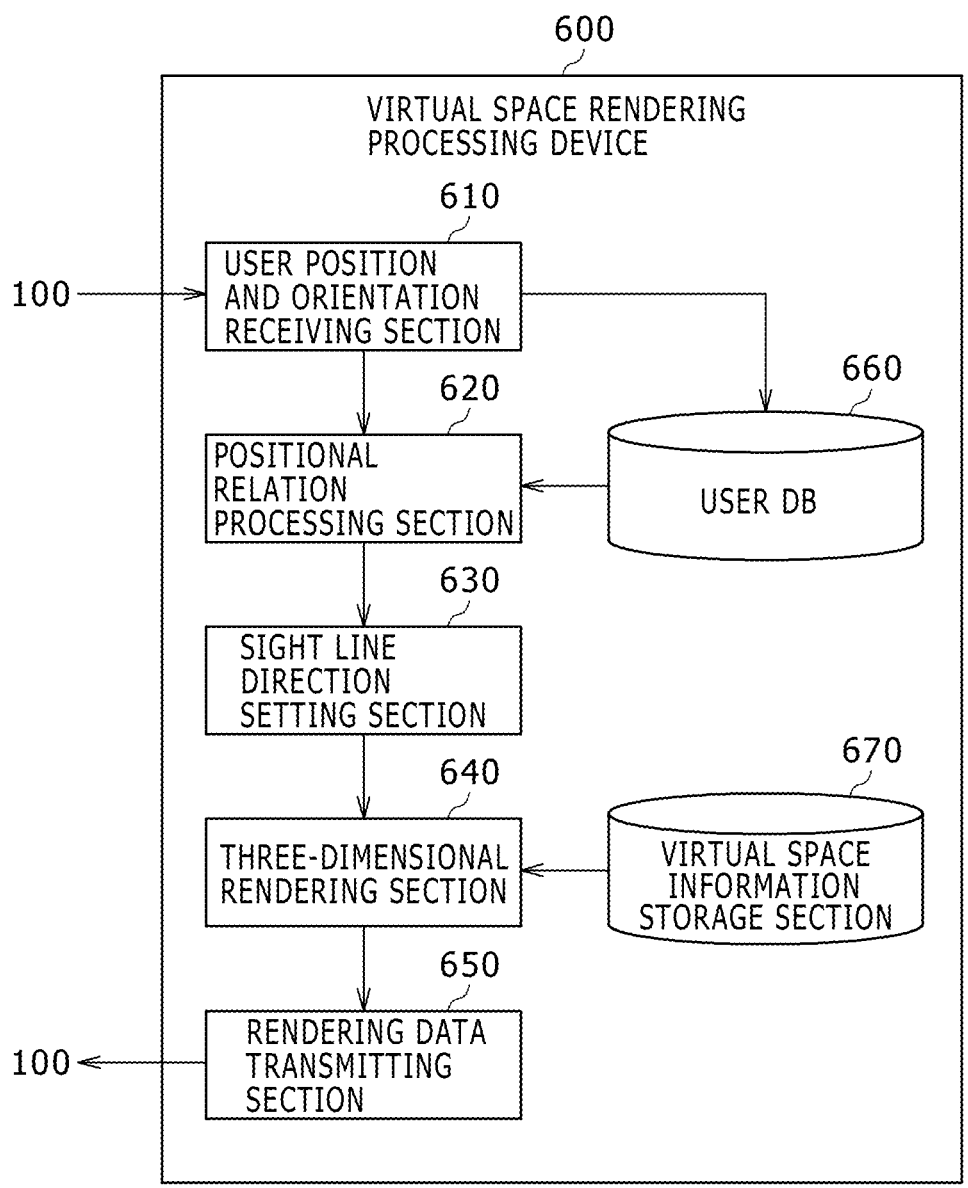
FIG. 6 is a functional block diagram of a virtual space rendering processing device.

FIG. 6 is a functional block diagram of a virtual space rendering processing device 600. The functional configuration of the virtual space rendering processing device 600 is implemented in the cloud server 200. Part of the functional configuration of the virtual space rendering processing device 600 can also be implemented in the head-mounted display 100.

A user position and orientation receiving section 610 receives, from the head-mounted display 100, information on the position of the user which information is obtained by the GPS sensor included in the head-mounted display 100 and information on the orientation of the head of the user which information is obtained by the attitude sensor included in the head-mounted display 100. The user position and orientation receiving section 610 stores the information on the position and the orientation of the user in a user database 660 in association with identifying information of the user.

A positional relation processing section 620 reads information on the positions and orientations of a plurality of users from the user database 660, and determines positional relation between the plurality of users. For example, when two users face each other in the real world, the positions and orientations of the avatars of the two users are determined such that the avatars also face each other in the virtual space. In addition, when a distance between user A and user B in the real world is larger than a distance between user A and user C, the avatar of user A is also disposed at a position closer to the avatar of user C than to the avatar of user B in the virtual space. When user A and user B face each other, the avatar of user A and the avatar of user B are made to face each other. When users A, B, and C face each other surrounding one object, the orientations of the avatars of users A, B, and C are determined such that the avatars of users A, B, and C also face each other surrounding an object in the virtual space.

A sight line direction setting section 630 sets the camera position of each user, or in other words the sight line direction of each user in the virtual space according to the real direction of the user. For example, when a plurality of users surround one object, directions in which the users face the real object are set as sight line directions of the users in the virtual space.

A three-dimensional rendering section 640 reads out information on the virtual space and the data of characters from a virtual space information storage section 670, and performs three-dimensional rendering of the virtual space as viewed from the sight line direction of each user. The avatar of each user is synthesized in the virtual space. A rendering data transmitting section 650 transmits virtual space rendering data to the head-mounted display 100.

Figure 7:
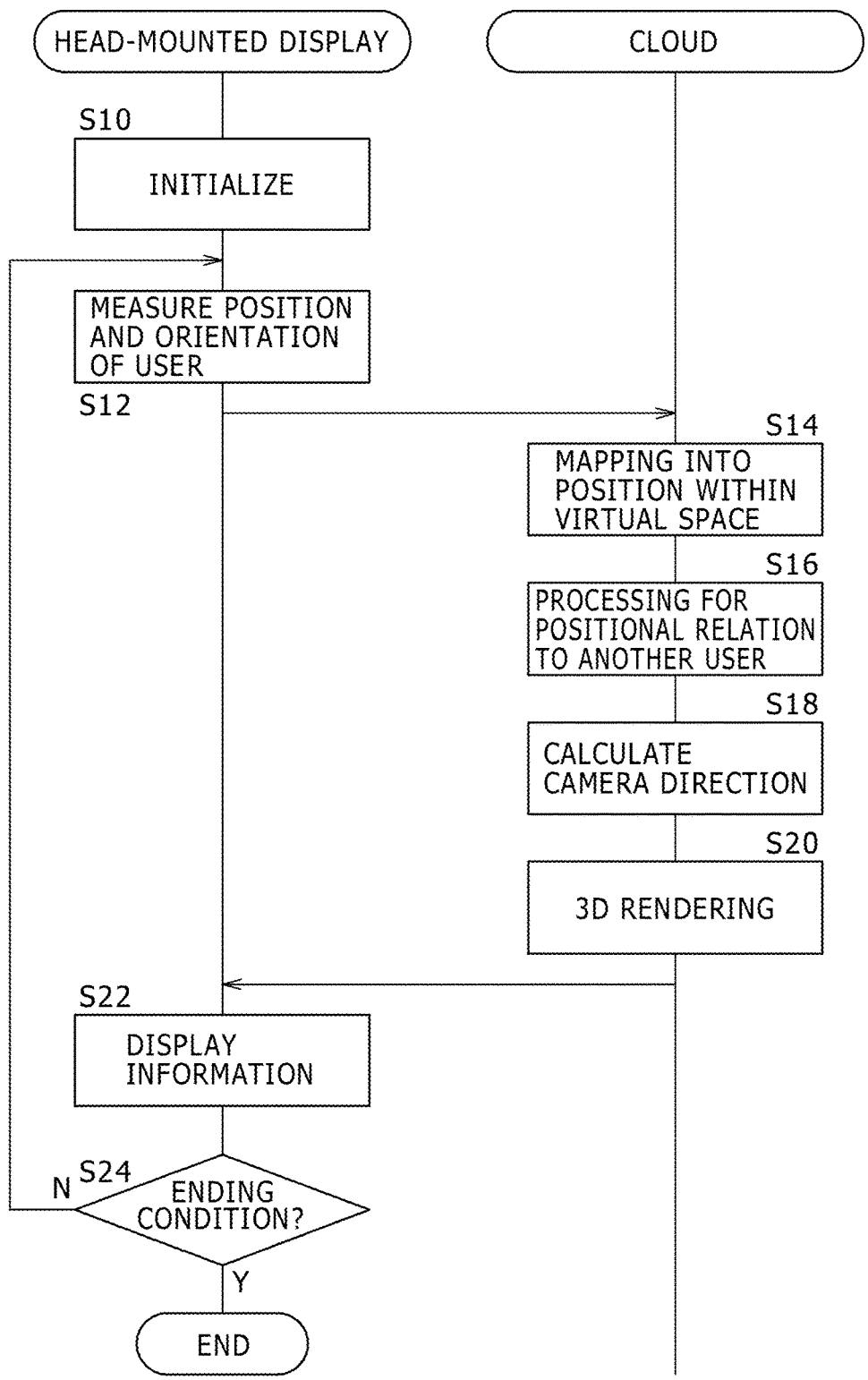
FIG. 7 is a sequence diagram of assistance in explaining a virtual space rendering processing procedure.

FIG. 7 is a sequence diagram of assistance in explaining a virtual space rendering processing procedure.

The head-mounted display 100 initializes various kinds of variables (S10). The GPS sensor and the attitude sensor included in the head-mounted display 100 measure the position and orientation of the user (S12). The communication control section 40 of the head-mounted display 100 transmits information on the position and orientation of the user to the cloud server 200.

The positional relation processing section 620 of the cloud server 200 maps the character of the user to a position within the virtual space on the basis of the position information of the user (S14). The positional relation processing section 620 calculates a relative positional relation to another user already mapped within the virtual space, and determines a position and an orientation in which to display the character of the user in question (S16). The sight line direction setting section 630 calculates the camera direction of the user in question, that is, the sight line direction of the user in question in the virtual space (S18). The three-dimensional rendering section 640 performs three-dimensional rendering of the virtual space as viewed from the viewpoint direction of the user in question (S20). The rendering data transmitting section 650 transmits three-dimensional rendering data to the head-mounted display 100.

The head-mounted display 100 displays the three-dimensional rendering data (S22). When an ending condition is satisfied (Y in S24), the procedure is ended. When the ending condition is not satisfied (N in S24), the procedure returns to step S12 to repeat the processing from step S12 on down.

FIG. 8 is a flowchart of assistance in explaining, in detail, a procedure of processing for the positional relation to the other user in step S16 in FIG. 7.

First, whether or not there is already an avatar in the virtual space is determined (S30). When there is no avatar in the virtual space yet (N in S30), the avatar of the user in question is made to appear in the virtual space (S42).

When there is already an avatar in the virtual space (Y in S30), a score of positional relation is calculated (S32). For example, the score of positional relation is obtained on the basis of a distance between the users in the real world. A relative positional relation between the avatars, that is, a distance between the avatars and the direction of one avatar with respect to the other avatar are determined using information on the position and direction of each user in the real world.

An example of the calculation of the score of positional relation in step S32 will be described with reference to FIGS. 12 to 15. The following description will be made of an example of a score calculating method. However, the score calculating method is not limited to this.

FIG. 12 and FIG. 13 are diagrams of assistance in explaining a method of calculating scores of positional relation of users in a case where there is no geographical correlation between the virtual space and the real world.

First, the distances and directions of other users with respect to each user are obtained on the basis of data on the latitude and longitude of the position of each user in the real world. The positions of the users in the real world are obtained by using GPS data. FIG. 12(a) shows data on the latitude and longitude of the positions of user 1, user 2, and user 3 in the real world.

FIG. 12(b) shows the distances and directions of user 2 and user 3 with respect to user 1 in the real world. The distance of user 2 with respect to user 1 is Lr_12, and the direction of user 2 with respect to user 1 is Ar_12. In addition, the distance of user 3 with respect to user 1 is Lr_13, and the direction of user 3 with respect to user 1 is Ar_13. Here, a direction is defined as a clockwise angle with respect to a parallel of latitude.

FIG. 12(c) similarly shows the distances and directions of user 2 and user 1 with respect to user 3 in the real world. The distance of user 2 with respect to user 3 is Lr_32, and the direction of user 2 with respect to user 3 is Ar_32. In addition, the distance of user 1 with respect to user 3 is Lr_31, and the direction of user 1 with respect to user 3 is Ar_31.

Incidentally, where there is only one avatar present in the virtual space in advance, the calculation of the direction can be omitted.

Next, the distances and directions of other users with respect to each user are obtained on the basis of the absolute coordinates of the position of each user in the virtual space. FIG. 13(a) shows the absolute coordinates of the positions of user 1, user 2, and user 3 in the virtual space.

FIG. 13(b) shows the distances and directions of user 2 and user 3 with respect to user 1 in the virtual space. The distance of user 2 with respect to user 1 is Lv_12, and the direction of user 2 with respect to user 1 is Av_12. In addition, the distance of user 3 with respect to user 1 is Lv_13, and the direction of user 3 with respect to user 1 is Av_13.

FIG. 13(c) similarly shows the distances and directions of user 2 and user 1 with respect to user 3 in the virtual space. The distance of user 2 with respect to user 3 is Lv_32, and the direction of user 2 with respect to user 3 is Av_32. In addition, the distance of user 1 with respect to user 3 is Lv_31, and the direction of user 1 with respect to user 3 is Av_31.

Next, the distances and directions between the users in the real world are compared with the distances and directions between the users in the virtual space to calculate a correlation coefficient.

The correlation coefficient Rmn of positional relations in the real world and the virtual space with respect to user m and user n is defined by the following equation:

$$Rmn = |Lv\_mn - Lr\_mn| \times |Av\_mn - Ar\_mn|$$

where |a| is an operation for obtaining the absolute value of a value a.

The correlation coefficient Rmn is used as a score of positional relation of the users (the smaller the correlation coefficient, the higher the score, and the larger the correlation coefficient, the lower the score). When the correlation coefficient Rmn is equal to or smaller than a threshold value set in advance, the positional relations in the real world and the virtual space are considered to be the same.

FIG. 14 and FIG. 15 are diagrams of assistance in explaining a method of calculating scores of positional relation of users in a case where there is a geographical correlation between the virtual space and the real world.

First, the distance and direction of each user with respect to a geographical reference point (Tokyo in this case) in the real world are obtained on the basis of data on the latitude and longitude of the position of each user in the real world and data on the latitude and longitude of the geographical reference point in the real world. The positions of the users in the real world are obtained by using GPS data. FIG. 14(a) shows data on the latitude and longitude of the positions of user 1, user 2, user 3, and Tokyo in the real world.

FIG. 14(b) shows the distance and direction of user 2 with respect to Tokyo in the real world. The distance of user 2 with respect to Tokyo in the real world is Lr_02, and the direction of user 2 with respect to Tokyo in the real world is Ar_02. Similarly, FIG. 14(c) shows the distance and direction of user 1 with respect to Tokyo in the real world. The distance of user 1 with respect to Tokyo in the real world is Lr_01, and the direction of user 1 with respect to Tokyo in the real world is Ar_01. FIG. 14(d) shows the distance and direction of user 3 with respect to Tokyo in the real world. The distance of user 3 with respect to Tokyo in the real world is Lr_03, and the direction of user 3 with respect to Tokyo in the real world is Ar_03.

Next, the distance and direction of each user with respect to the geographical reference point (Tokyo in this case) in the virtual space are obtained on the basis of the absolute coordinates of the position of each user in the virtual space and the absolute coordinates of the geographical reference point in the virtual space. FIG. 15(a) shows the absolute coordinates of the positions of user 1, user 2, user 3, and Tokyo in the virtual space.

FIG. 15(b) shows the distance and direction of user 2 with respect to Tokyo in the virtual space. The distance of user 2 with respect to Tokyo in the virtual space is Lv_02, and the direction of user 2 with respect to Tokyo in the virtual space is Av_02. Similarly, FIG. 15(c) shows the distance and direction of user 1 with respect to Tokyo in the virtual space. The distance of user 1 with respect to Tokyo in the virtual space is Lv_01, and the direction of user 1 with respect to Tokyo in the virtual space is Av_01. FIG. 15(d) shows the distance and direction of user 3 with respect to Tokyo in the virtual space. The distance of user 3 with respect to Tokyo in the virtual space is Lv_l03, and the direction of user 3 with respect to Tokyo in the virtual space is Av_03.

Next, the distances and directions between the reference point and the users in the real world are compared with the distances and directions between the reference point and the users in the virtual space to calculate a correlation coefficient.

The correlation coefficient R0m of positional relations in the real world and the virtual space with respect to the reference point and user m is defined by the following equation:

$$R0m = |Lv\_0m - Lr\_0m| \times |Av\_0m - Ar\_0m|$$

The correlation coefficient R0m is used as a score of positional relation of the user (the smaller the correlation coefficient, the higher the score, and the larger the correlation coefficient, the lower the score). When the correlation coefficient R0m is equal to or smaller than a threshold value set in advance, the positional relations in the real world and the virtual space are considered to be the same.

Reference will be made to FIG. 8 again. Whether or not the positional relation in the real world and the positional relation of the avatar within the virtual space are the same is determined (S34). This is because the avatar may move within the virtual space, and thus deviate from the real positional relation. The correlation coefficient Rmn (or R0m) obtained in step S32 is compared with a threshold value Rth. When Rmn<Rth (or R0m<Rth) with respect to all users, it is determined that the positional relation in the real world and the positional relation of the avatar within the virtual space are the same. When the positional relation in the real world and the positional relation of the avatar within the virtual space are maintained in a predetermined range (Y in S34), the avatar of the user in question is made to appear in the virtual space (S42).

When the positional relation in the real world and the positional relation of the avatar within the virtual space are not maintained (N in S34), whether or not places close to the real positional relation between the users are present in the virtual space is determined (S36). When Rmn<Rth (or R0m<Rth) with respect to one or more users in the comparison of the correlation coefficient with the threshold value which comparison is made in step S34, it is determined that places close to the real positional relation between the users are present in the virtual space. When the places close to the real positional relation between the users are present within the virtual space (Y in S36), a place corresponding to a highest score is determined as a closest place from among the places (S38). For example, the position is determined using only data of users satisfying Rmn<Rth (or R0m<Rth) in the comparison of the correlation coefficient with the threshold value which comparison is made in step S34. When there is no place close to the real positional relation between the users within the virtual space (N in S36), an appropriate place, for example a random position or a rearmost position is determined (S40). In either case, the avatar of the user in question is made to appear in the determined place (S42).

FIGS. 9A to 9D are diagrams of assistance in explaining an example in which the avatars of users are made to appear in the virtual space. Description in the following will be made of an example in which the avatars 700a to 700d of four users A to D are made to appear in the virtual space. Suppose that the four users A to D are in different places in the real world.

Figure 9A:
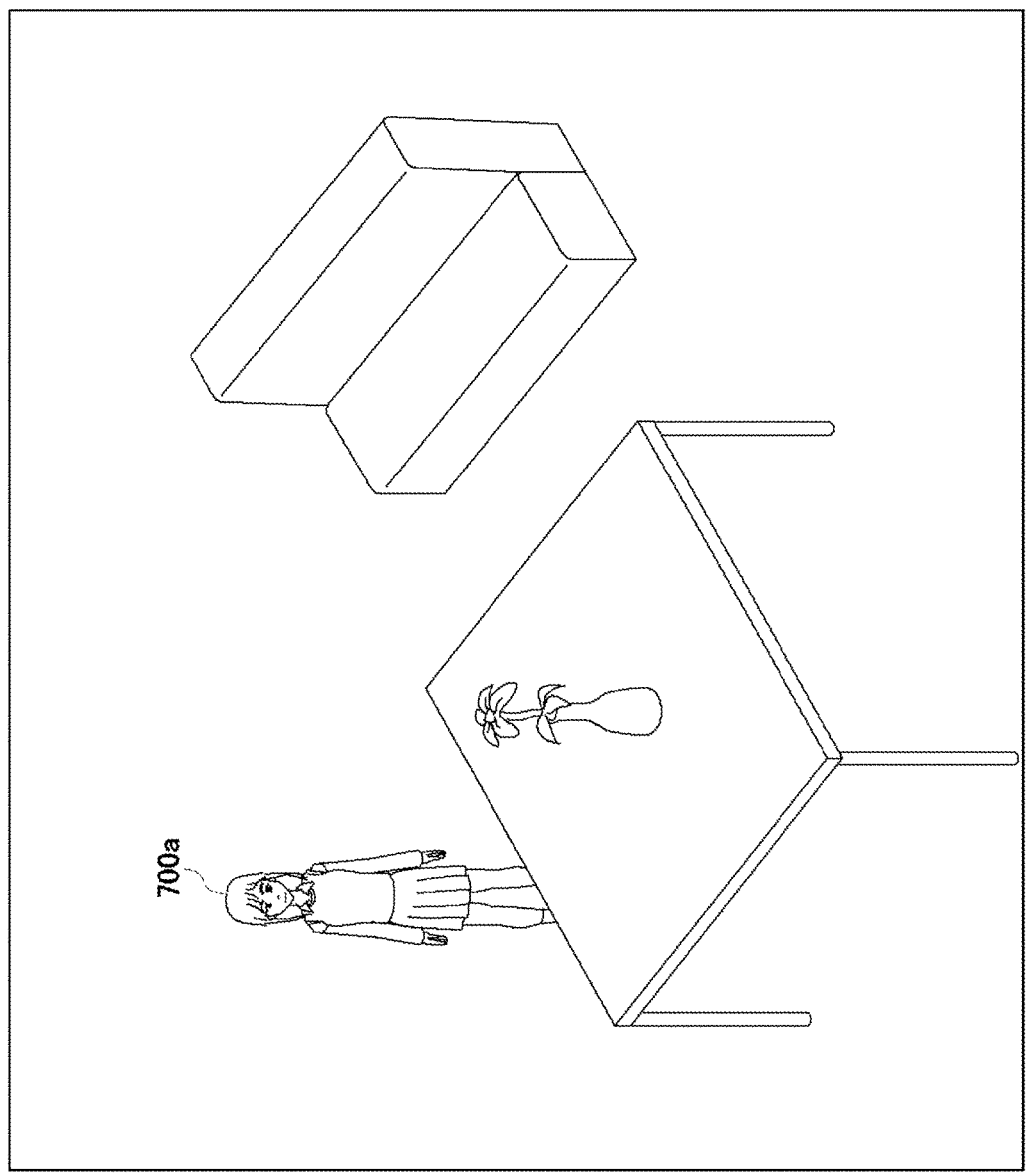
FIG. 9A is a diagram of assistance in explaining the avatar of a first user which avatar has appeared in a virtual space.

As shown in FIG. 9A, suppose that user A has first logged in to the virtual space, and that the avatar 700a has thus appeared within the virtual space.

Suppose that the other users, that is, user B, user C, and user D are located at positions closer to user A in this order in the real world. For example, suppose that user A is located in Tokyo, while user B is located in Yokohama, user C is located in Kobe, and user D is located in Hong Kong.

Figure 9B:
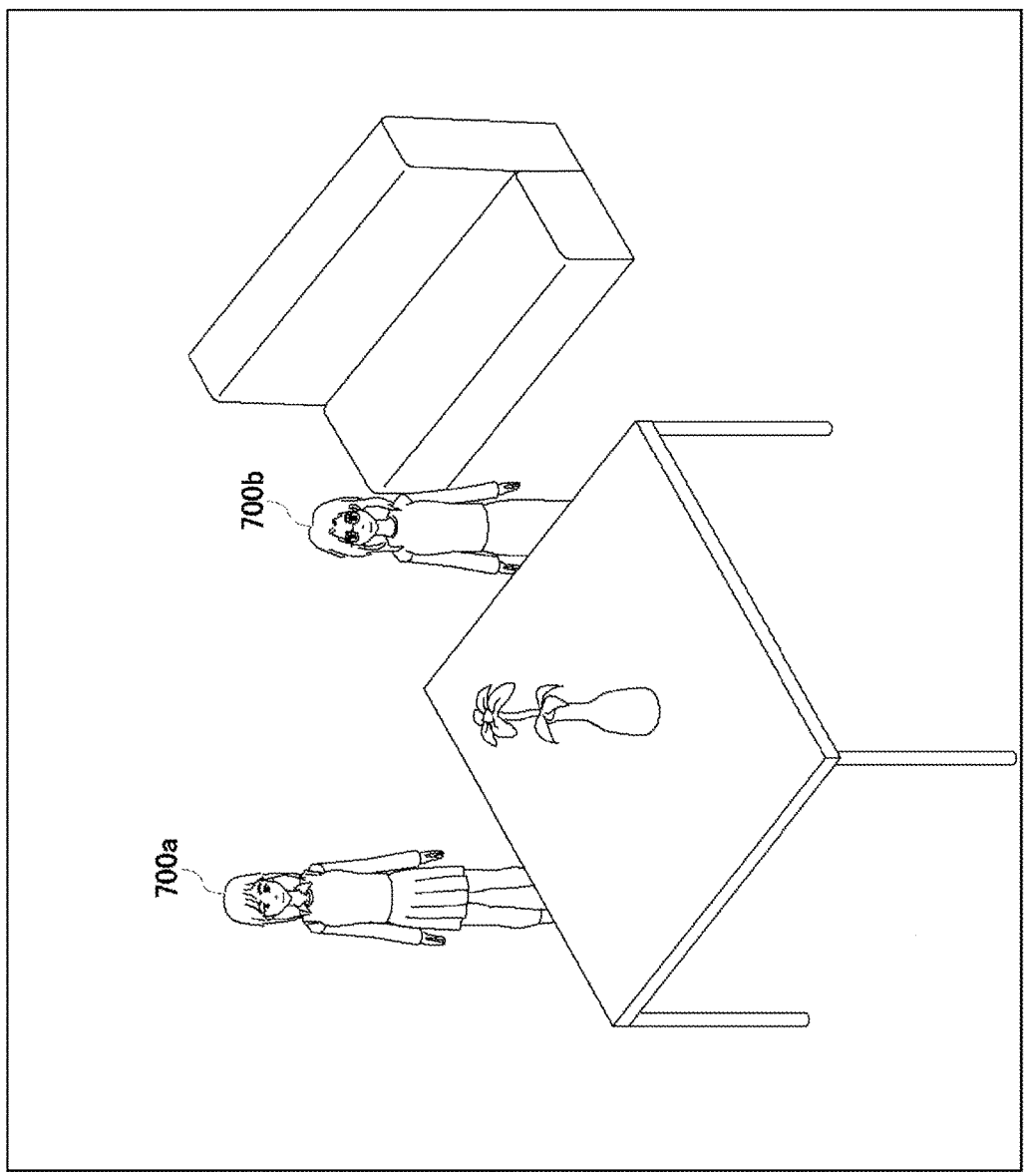
FIG. 9B is a diagram of assistance in explaining the avatar of a second user which avatar has appeared in the virtual space.
Figure 9D:
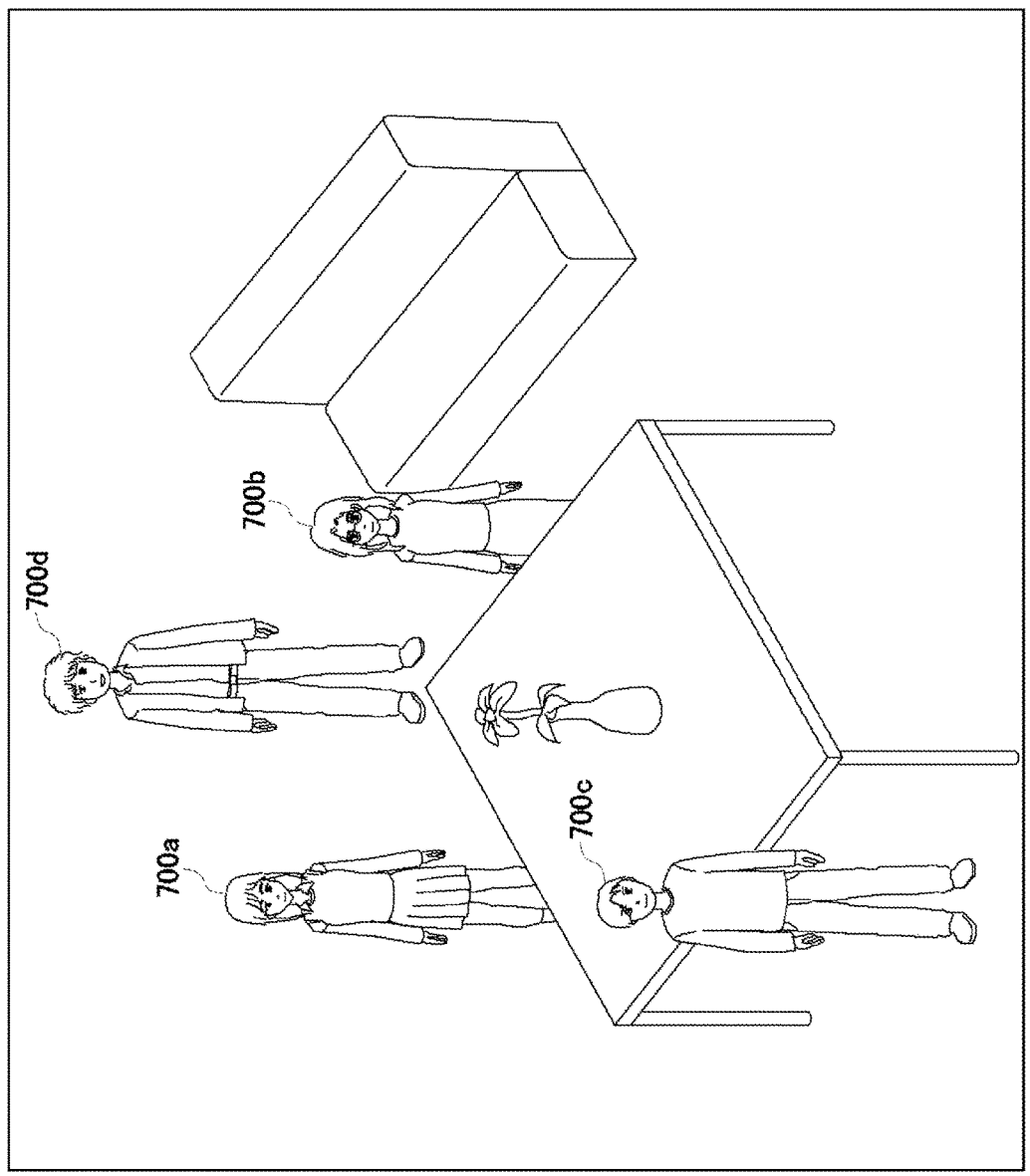
FIG. 9D is a diagram of assistance in explaining the avatar of a fourth user which avatar has appeared in the virtual space.

When the avatars of user B, user C, and user D are made to appear within the virtual space, the avatar 700b of user B is made to appear first as shown in FIG. 9B, the avatar 700c of user C is made to appear next as shown in FIG. 9C, and the avatar 700d of user D is made to appear last as shown in FIG. 9D, in consideration of positional relation in the real world. Thus, the avatar of a user located closer to a user whose avatar is made to appear first appears earlier, and the avatar of a user located farther appears slowly. By thus changing a speed of appearance of the avatar of each user according to the real distance between the users, a sense of distance in the real world can be reflected in the virtual space.

In the above description, consideration is given to a case where users A, B, C, and D are in places distant from each other. When users A, B, C, and D are in a same room, for example, the orientations of users A, B, C, and D may be reflected in the orientations of the avatars 700a, 700b, 700c, and 700d within the virtual space. For example, when user A and user B face each other with a table between user A and user B, the avatar 700a of user A and the avatar 700b of user B are arranged in such positions as to face each other with a table within the virtual space between the avatar 700a of user A and the avatar 700b of user B.

Figure 10:
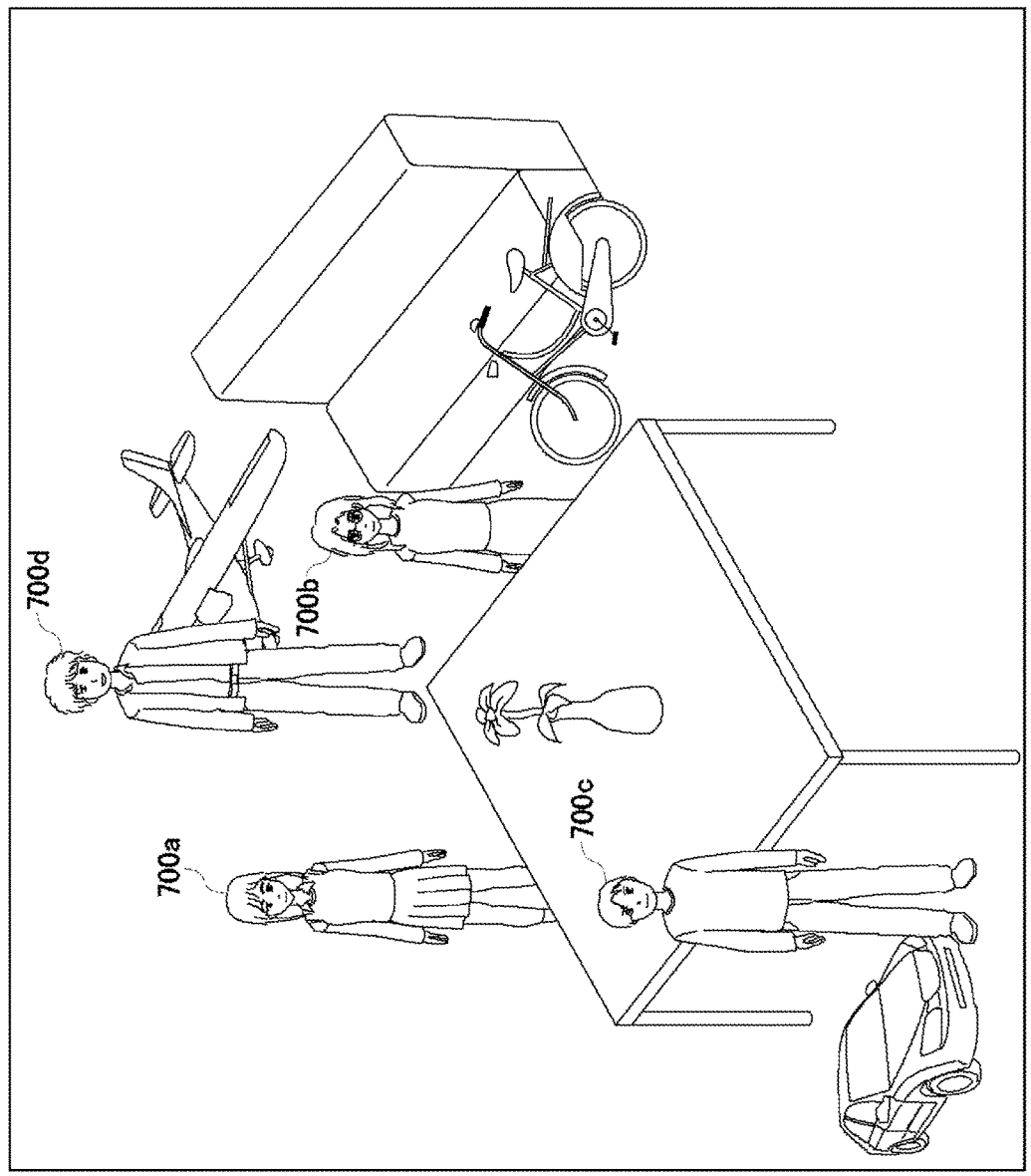
FIG. 10 is a diagram of assistance in explaining another example in which the avatars of users are made to appear in a virtual space.

FIG. 10 is a diagram of assistance in explaining another example in which the avatars of users are made to appear in the virtual space. In FIGS. 9A to 9D, the order in which the avatars 700b, 700c, and 700d of users B, C, and D are made to appear is determined on the basis of the real positional relations of users B, C, and D to user A whose avatar 700a is made to appear first in the virtual space. In FIG. 10, the avatars 700b, 700c, and 700d of users B, C, and D appear riding a vehicle.

As shown in FIG. 10, the avatar 700b of user B located at the position closest to user A appears riding a bicycle, the avatar 700c of user C located at the next closest position appears riding an automobile, and the avatar 700d of user D located at the most distant position appears riding an airplane. By thus varying the vehicles of the avatars according to the distances to the user whose avatar is made to appear first, a sense of distance in the real world can be reflected in the virtual space.

As described in FIGS. 9A to 9D and FIG. 10, by varying the manners in which the avatars of the other users appear according to the distances to the user whose avatar is made to appear first in the virtual space, the user can feel a sense of real distance also in the virtual space displayed on the head-mounted display 100. Incidentally, both of the speed of appearance of the avatars and the kinds of vehicles may be changed according to the real distances between the users.

Figure 11:
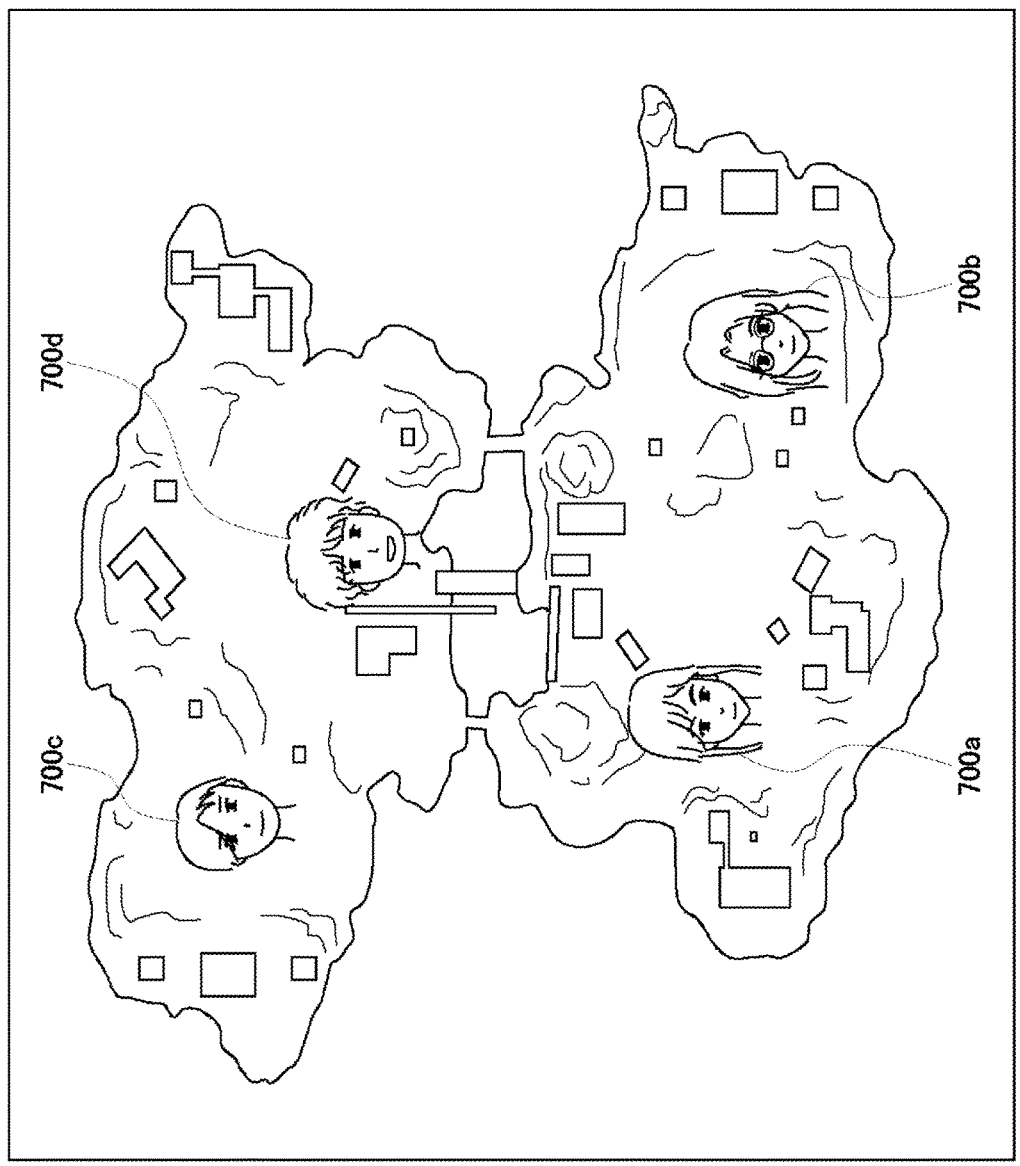
FIG. 11 is a diagram of assistance in explaining an example in which the avatars of users are made to appear on a game screen.

FIG. 11 is a diagram of assistance in explaining an example in which the avatars of the users are made to appear on a game screen. Distances from a reference point (for example Tokyo) on earth to the real positions of the users are reflected in a game. However, in order to prevent disadvantages in the game according to the real positions of the users, the reference point is set randomly, or changed depending on conditions.

As shown in FIG. 11, the avatars 700a, 700b, 700c, and 700d of users A, B, C, and D are displayed by mapping the positions on earth of users A, B, C, and D to positions within the game while the mutual positional relations are maintained as much as possible. The positions that can be taken within the game are limited. Thus, the real positional relations between users A, B, C, and D do not need to correspond exactly to the positional relations within the virtual space between the avatars 700a, 700b, 700c, and 700d. It suffices for senses of distances between the users in the real world to be reflected in the positional relations between the avatars in the virtual space to some degree.

As described above, according to the present embodiment, by incorporating a head-mounted display having a sensor capable of detecting a position and an attitude into a cloud service, the real positional relation and the real attitude of a user wearing the head-mounted display can be reflected in the virtual space, and a sense of immersion in the screen displayed on the head-mounted display and operability can be enhanced. In addition, the hardware configuration of the head-mounted display on a client side can be simplified by using a cloud server.

The present invention has been described above on the basis of embodiments thereof. The embodiments are illustrative, and it is to be understood by those skilled in the art that combinations of constituent elements and processing processes of the embodiments are susceptible of various modifications and that such modifications also fall within the scope of the present invention. Such modifications will be described.

REFERENCE SIGNS LIST

10 Control section, 20 Input interface, 30 Output interface, 32 Backlight, 40 Communication control section, 42 Network adapter, 44 Antenna, 50 Storage section, 60 GPS unit, 62 Radio unit, 64 Attitude sensor, 70 External input-output terminal interface, 72 External memory, 80 Clock section, 100 Head-mounted display, 110 Main body portion, 120 Frontal region contact portion, 130 Temporal region contact portion, 200 Cloud server, 300 Camera, 400 Network, 500 Panoramic image generating device, 510 Photographed image receiving section, 520 Image data storage section, 530 Panoramic image processing section, 540 Format converting section, 550 Panoramic image transmitting section, 600 Virtual space rendering processing device, 610 User position and orientation receiving section, 620 Positional relation processing section, 630 Sight line direction setting section, 640 Three-dimensional rendering section, 650 Rendering data transmitting section, 660 User database, 670 Virtual space information storage section

INDUSTRIAL APPLICABILITY

The present invention is applicable to a technology for generating an image to be displayed on a head-mounted display.

The invention claimed is:

1. An image generating device comprising:
a position information receiving section receiving, at a cloud-based server over a network, information on respective positions of a plurality of users, each wearing a head-mounted display, the information being obtained by a respective global position sensor included in each head-mounted display;
a positional relation processing section determining positional relation between virtual characters of the plurality of users on a basis of positional relation between the plurality of users;
a three-dimensional rendering section arranging the virtual characters of the plurality of users in a virtual space on the basis of the positional relation between the virtual characters, and rendering the virtual space; and
a rendering data transmitting section transmitting, from the cloud-based server, information on the rendered virtual space to each head-mounted display over the network,
wherein the three-dimensional rendering section changes a respective appearance of each respective virtual character of each user among the plurality of users in the virtual space based on differences in real distances between the plurality of users in real space, and
wherein the three-dimensional rendering section changes a respective speed at which the respective virtual character of each user among the plurality of users appears in the virtual space according to real distances between the plurality of users in real space.

2. The image generating device according to claim 1, further comprising
an orientation information receiving section receiving information on respective orientations of the heads of the plurality of users, the information being obtained by a respective attitude sensor included in each of the head-mounted displays,
wherein the positional relation processing section determines respective orientations within the virtual space of the respective virtual character of each user of the plurality of users on a basis of the respective orientations of the heads of each user.

3. The image generating device according to claim 1, wherein the three-dimensional rendering section changes a kind of vehicle ridden by the respective virtual character of each user among the plurality of users at a time of appearing in the virtual space according to real distances between the plurality of users in real space.

4. An image generating method, comprising:
receiving, at a cloud-based server over a network, information on respective positions of a plurality of users, each wearing a head-mounted display, the information being obtained by a respective global position sensor included in each head-mounted display;
determining positional relation between virtual characters of the plurality of users on a basis of positional relation between the plurality of users;
arranging the virtual characters of the plurality of users in a virtual space on the basis of the positional relation between the virtual characters, and rendering the virtual space; and
transmitting, from the cloud-based server, information on the rendered virtual space to each head-mounted display over the network,
wherein the arranging includes changing a respective appearance of each respective virtual character of each user among the plurality of users in the virtual space based on differences in real distances between the plurality of users in real space, and
wherein the three-dimensional rendering section changes a respective speed at which the respective virtual character of each user among the plurality of users appears in the virtual space according to real distances between the plurality of users in real space.

5. A non-transitory, computer readable recording medium containing a program, which when executed by a computer, causes the computer to perform actions, comprising:
receiving, at a cloud-based server over a network, information on respective positions of a plurality of users, each wearing a head-mounted display, the information being obtained by a respective global position sensor included in each head-mounted display;
determining positional relation between virtual characters of the plurality of users on a basis of positional relation between the plurality of users;
arranging the virtual characters of the plurality of users in a virtual space on the basis of the positional relation between the virtual characters, and rendering the virtual space; and
transmitting, from the cloud-based server, information on the rendered virtual space to each head-mounted display over the network,
wherein the arranging includes changing a respective appearance of each respective virtual character of each user among the plurality of users in the virtual space based on differences in real distances between the plurality of users in real space, and
wherein the three-dimensional rendering section changes a respective speed at which the respective virtual character of each user among the plurality of users appears in the virtual space according to real distances between the plurality of users in real space.

* * * * *